(12) United States Patent
Komai

(10) Patent No.: US 6,813,104 B2
(45) Date of Patent: Nov. 2, 2004

(54) CONTROL APPARATUS FOR MAGNETIC WRITE

(75) Inventor: Yasuhito Komai, Mishima (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 478 days.

(21) Appl. No.: 09/952,034

(22) Filed: Sep. 13, 2001

(65) Prior Publication Data

US 2003/0048556 A1 Mar. 13, 2003

(51) Int. Cl.⁷ .............................................. G11B 25/04
(52) U.S. Cl. .............................................. 360/2; 360/1
(58) Field of Search ........................................ 360/2, 1

(56) References Cited

U.S. PATENT DOCUMENTS 4,779,145 A * 10/1988 Lemelson ....................... 360/2

6,016,959 A * 1/2000 Kamo et al. .................... 360/2

* cited by examiner

Primary Examiner—David Hudspeth
Assistant Examiner—Rocio Colon
(74) Attorney, Agent, or Firm—Frishauf, Holtz, Goodman & Chick, P.C.

(57) ABSTRACT

A magnetic write control apparatus transports a medium having a magnetic stripe, until the magnetic stripe reaches a magnetic write position. The apparatus moves a magnetic head and the medium relative to each other, thereby to perform magnetic writing on the magnetic stripe. The magnetic head magnetically writes prescribed data on the magnetic stripe, asynchronously with the relative motion of the magnetic head and the medium.

2 Claims, 2 Drawing Sheets

CONTROL APPARATUS FOR MAGNETIC WRITE

BACKGROUND OF THE INVENTION

1. Field of the Invention

The present invention relates to a magnetic write control apparatus that controls the magnetic writing of prescribed data on magnetic stripes.

2. Description of the Related Art

Generally known are magnetic write control apparatuses that magnetically write data on a magnetic stripe provided on media such as booklets and cards. After an operator inserts a medium into a magnetic write control apparatus, the apparatus transports a medium transports it to the magnetic write position where a magnetic head is located. Once the magnetic stripe on the medium reaches the magnetic write position, the magnetic write control apparatus moves the magnetic head along a shaft. The magnetic head magnetically moves along the shaft, it writes prescribed data on the magnetic stripe.

In such a magnetic write control apparatus, the position of the magnetic head is controlled by an encoder that operates in synchronism with the shaft rotation of an electric motor. The magnetic write control apparatus controls the transport of the magnetic head and the magnetic data-writing in accordance with the position of the magnetic head, which controlled by the encoder. Therefore, the control of the transport of the head and the control of the data-writing need to be performed synchronously.

If the control of the transport of the magnetic head and the control of magnetic data-writing are synchronized by means of the encoder, however, the density at which the magnetic write control apparatus magnetically writes data on the magnetic stripe will be limited to an integral multiple of the resolution of the encoder.

BRIEF SUMMARY OF THE INVENTION

An object of the present invention is to provide a magnetic write control apparatus that can magnetically write data at various recording densities.

A magnetic write control apparatus according to an embodiment of the present invention comprises: a transport section configured to transport an inserted medium equipped with the magnetic stripe, thereby to move the magnetic stripe to a magnetic write position; a first control section configured to move a magnetic head in relative to the medium, thereby to perform magnetic writing on the magnetic stripe; and a second control section which causes the magnetic head to magnetically write prescribed data on the magnetic stripe, asynchronously with the relative motion of the magnetic head, which is accomplished by the first control section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and comprise a part of the specification, illustrate presently embodiments of the invention, and together with the general description given above and the detailed description of the embodiments given below, serve to explain the principles of the invention.

DETAILED DESCRIPTION OF THE INVENTION

An embodiment of the present invention will be described, with reference to the accompanying drawings.

Figure 1:
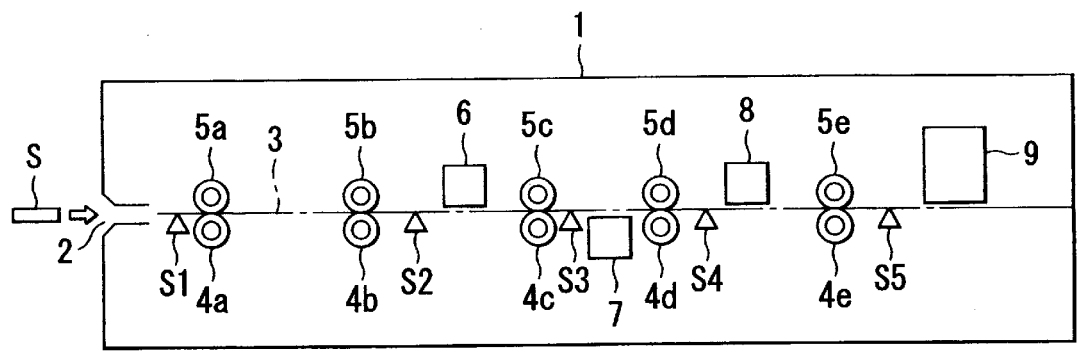
FIG. 1 is a sectional view showing a magnetic write control apparatus according to an embodiment of the present invention.

FIG. 1 is a sectional view depicting a magnetic write control apparatus according to an embodiment of this invention.

The magnetic write control apparatus 1 has an inlet port 2 through which a booklet S having a magnetic stripe on the back can be inserted while kept opened. The apparatus 1 has a transport path 3 through which the booklet S, kept opened, is transported from the inlet port 2 to the rearmost part of the apparatus 1.

Conveyer rollers 4a, 4b, 4c, 4d and 4e are arranged below the transport path 3 and at regular intervals, from the inlet port 2 in the order they are mentioned. Driven rollers 5a, 5b, 5c, 5d and 5e are provided above the transport path 3, from the inlet port 2 in the order they are mentioned, and oppose the conveyer rollers 4a, 4b, 4c, 4d and 4e, respectively. The magnetic write control apparatus 1 transports the booklet S from the upstream to the downstream when the conveyer rollers 4a to 4e rotate in forward direction. The apparatus 1 transports the booklet S from the downstream to the upstream when the conveyer rollers 4a to 4e rotate in reverse direction.

A positioning section 6 is arranged above the transport path 3 and between the conveyer rollers 4b and 4c, for moving the booklet S widthwise to correct the position thereof. A magnetic head section 7 is positioned below the transport path 3 and between the conveyer rollers 4c and 4d, for writing data magnetically. A reading section 8 is provided above the transport path 3 and between the conveyer rollers 4d and 4e, for reading data such as the number of lines printed on the booklet S. A printing section 9 is arranged above the transport path 3, at the rearmost part thereof and at the downstream of the conveyor roller 4e, to print data on the booklet S.

A sensor S1 is provided at the upstream of the conveyer roller 4a, for detecting the booklet S inserted into the inlet port 2. A sensor S2 is provided at the upstream of the positioning section 6, for detecting the position of the booklet S in order to correct the position of the booklet S. A sensor S3 is arranged at the upstream of the magnetic head section 7, for detecting the position of the booklet S in order to magnetically write data on the magnetic stripe provided on the booklet S. A sensor S4 is provided at the upstream of the reading section 8, for detecting the position of the booklet S in order to read the number of lines printed on the booklet S. A sensor S5 is arranged at the upstream of the printing section 9, for detecting the position of the booklet S in order to print data on the booklet S.

The sensors S1 to S5 are optical sensors, each comprising, for example, a light-emitting section and a light-receiving section. The light-emitting section and the light-receiving section lie above and below the transport path 3, respectively, and oppose each other across the path 3.

It will be described how the process that the control section of the magnetic write control apparatus 1 operates when the booklet S opened is inserted into the inlet port 2.

The control section of the magnetic write control apparatus 1 determines that the booklet S has been inserted, when the sensor S1 detects the booklet S. Then, the control section rotates the conveyer rollers 4a to 4e in the forward direction. The booklet S is thereby transported downstream.

When the sensor S2 detects the booklet S, the control section transports the booklet S for a predetermined distance and stops it. The control section controls the positioning section 6, which moves the booklet S widthwise to a prescribed position. The position of the booklet S is thereby corrected. The control section then rotate the conveyer rollers 4a to 4e in the forward direction, whereby the booklet S is transported downstream.

When the sensor S3 detects the booklet S, the control section transports the booklet S for a predetermined distance and then stops it. The control section controls the magnetic head section 7, which magnetically writes prescribed data on the magnetic stripe provided on the booklet S. Next, the control section rotates the conveyer rollers 4a to 4e in the forward direction. The booklet S is thereby transported downstream.

When the sensor S4 detects the booklet S, the control section transports the booklet S for a predetermined distance and then stops it. The control section controls the reading section 8, which reads the printing data representing the number of lines already printed on the booklet. Thereafter, the control section rotates the conveyer rollers 4a to 4e in the forward direction. The booklet S is therefore transported downstream.

When the sensor S5 detects the booklet S, the control section transports the booklet for a prescribed distance and then stops it. The control section controls the printing section 9, which prints print data on the booklet S. Upon completion of this printing of data, the control section rotates the conveyer rollers 4a to 4e in the reverse direction. The booklet S is thereby transported upstream and ejected from the inlet port 2.

Figure 2:
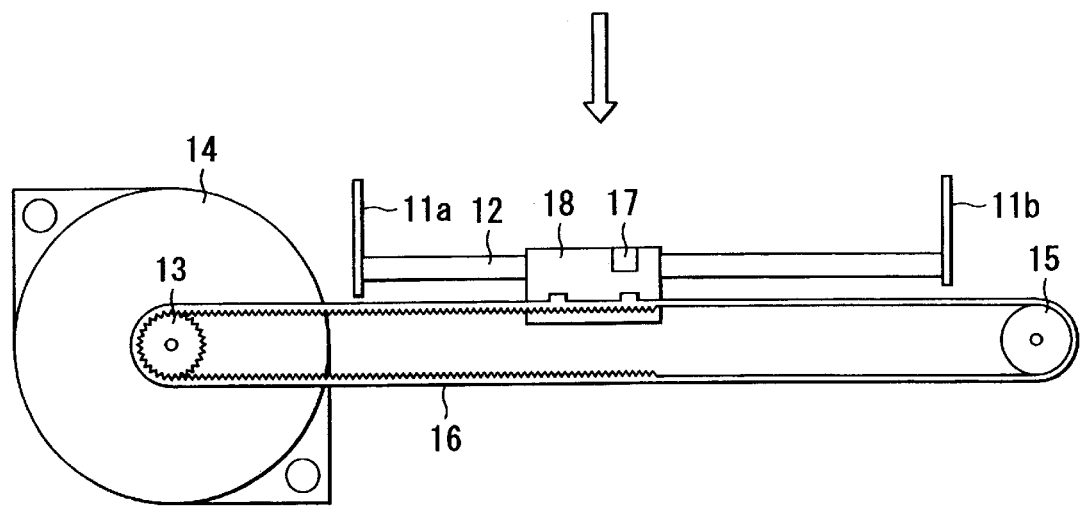
FIG. 2 is a diagram illustrating the structure of the magnetic head incorporated in the magnetic write control apparatus according to the embodiment.

FIG. 2 is a diagram illustrating the structure of the magnetic head section 7.

The booklet S taken into the inlet port 2, while kept open, is transported over the magnetic head section 7 in the direction of the arrow shown in FIG. 2. Frames 11a and 11b stand upright at the left and right, respectively, extending parallel to the direction of transporting the booklet S. The left frame 11a and the right frame 11b hold a shaft 12 at ends. The shaft 12 extends at right angles to the direction of transporting the booklet S.

Outside the frame 11a there is provided a pulse motor 14. The pulse motor 14 has a toothed motor shaft 13 that can rotate in forward and reverse directions when a pulse voltage is applied to the pulse motor 14. A driven pulley 15 is arranged outside the frame 11a, opposing the pulse motor 14. The pulley 15 can freely rotate.

An endless belt 16 is wrapped around the toothed motor shaft 13 and the driven pulley 15. The endless belt 16 has teeth on its inner side. The teeth of the motor shaft 13 are in mesh with the teeth of the endless belt 16. A carrier 18 is fastened to the toothed endless belt 16. The carrier 18 incorporates a magnetic head 17.

In the magnetic head section 7, the toothed motor shaft 13 rotates when the pulse motor 14 is driven. As the toothed motor shaft 13 rotates, the toothed belt 16 is driven. The carrier 18 fastened to the toothed belt 16 therefore moves along the shaft 12, between the frame 11a and the frame 11b.

Figure 3:
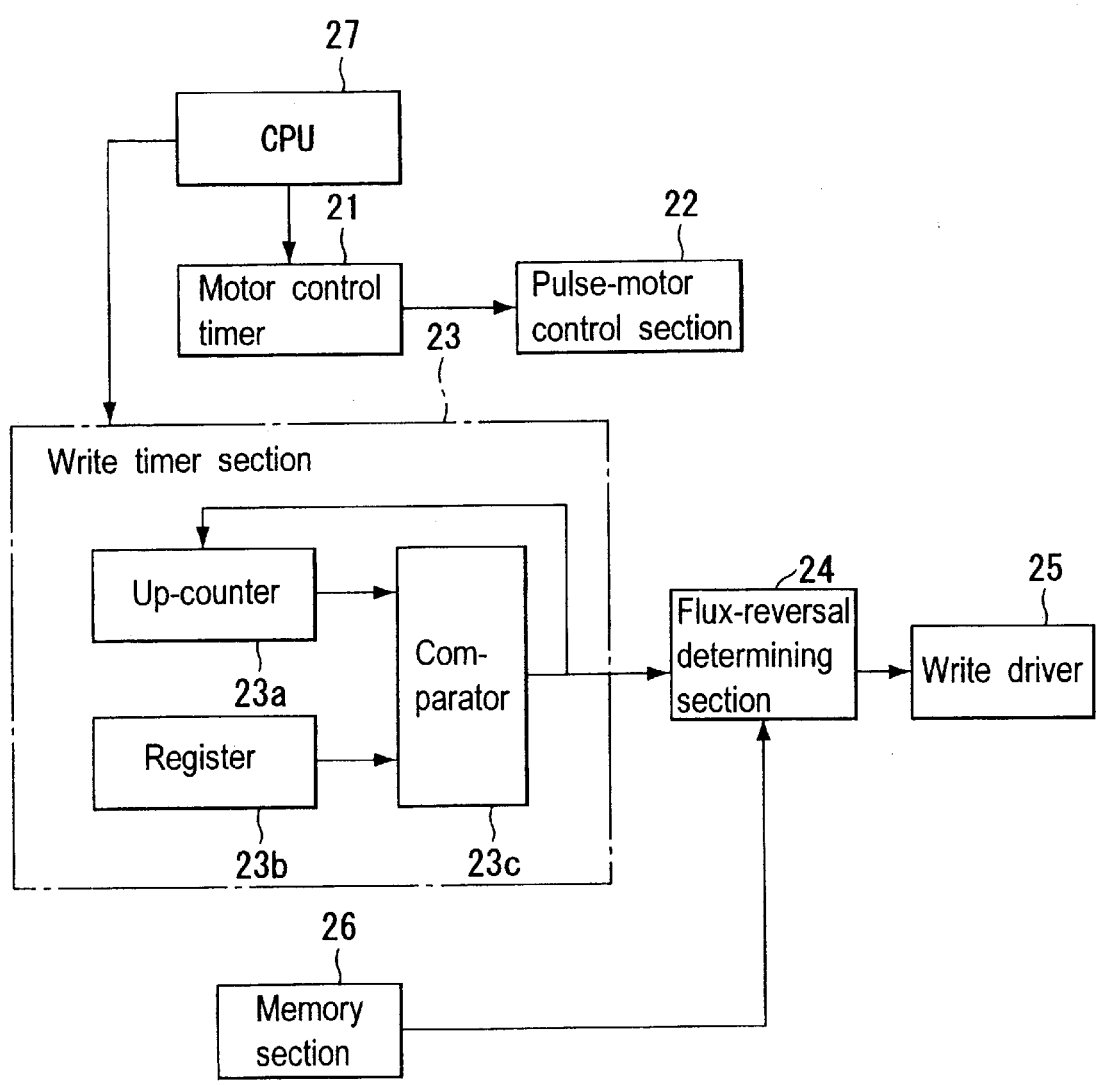
FIG. 3 is a control block diagram of the magnetic write control apparatus according to the embodiment.

FIG. 3 is a block diagram showing the control section of the magnetic head section 7.

The control section of the magnetic head section 7 comprises a motor control timer 21, a pulse-motor control section 22, a write timer section 23, a flux-reversal determining section 24, a write diver 25, a memory section 26. The memory section 16 stores write data. A CPU 27 is the major component of the magnetic write control apparatus 1. The CPU 27 controls the motor control timer 21 and the write timer section 23.

The motor control timer 21 generates a phase-switching signal for the pulse motor 14. The motor control timer 21 supplies the phase-switching signal to the pulse-motor control section 22. The pulse-motor control section 22 controls and drives the pulse motor 14 in accordance with the phase-switching signal. The carrier 18 is thereby moved along the shaft 12.

The write timer section 23 comprises an up-counter 23a, a register 23b, and a comparator 23c. The up-counter 23a is a free-run counter that starts and stops operating in accordance with signals supplied from the CPU 27. The register stores a count value set by an operator. The comparator 23c compares the count value of the up-counter 23a with the count value stored in the register 23b. In the write timer section 23, the up-counter 23a, register 23b and comparator 23c cooperate to generate a write-timing signal, in response to which the magnetic head 17 magnetically writes data.

The flux-reversal determining section 24 determines whether flux reversal has occurred at the magnetic stripe, from the writing-timing signal and the write data stored in the memory section 26. The flux-reversal determining section 24 controls the write diver 25 in accordance with whether the flux reversal has taken place or not.

The comparator 23c compares the value made by the up-counter 23a, with the value stored in the register 23b.

If the values are found equal to each other, the comparator 23c clears the up-counter 23a and supplies the write-timing signal to the flux-reversal determining section 24.

The flux-reversal determining section 24 controls the write driver 25 in accordance with the write-timing signal supplied from the comparator 23c and the write data stored in the memory section 26.

The write driver 25 controls the current-flowing direction in the magnetic head 17, thus subjecting the magnetic stripe to flux reversal. Data is thereby written on the magnetic stripe.

In the present embodiment, the magnetic head 17 can magnetically write, on the magnetic stripe, the write data stored in the memory section 26, every time the could value of the up-counter 23a coincides with the value stored in the register 23b.

Additionally, the magnetic head 17 can perform magnetic writing asynchronously with the phase-switching signal supplied to the pulse motor 14.

Therefore, the magnetic head 17 can magnetically write data on the magnetic stripe, at a variety of recording densities, by changing the value stored in the register 23b.

In this embodiment, the booklet S is stopped at a magnetic write position and the magnetic head 17 is then moved along the shaft 12. The magnetic head 17 magnetically writes prescribed data, asynchronously with the control of its position. Nonetheless, the magnetic head 17 may be held at a specific position, and the booklet S is transported so that the magnetic stripe provided on it may pass by the magnetic head. In this case, too, the magnetic head magnetically writes data on the magnetic stripe, asynchronously with the transport of the booklet. This achieves the same advantage as has been described.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic write control apparatus comprising:
   a transport section configured to transport an inserted medium equipped with a magnetic stripe, thereby to move the magnetic stripe to a magnetic write position;
   a first control section configured to move a magnetic head relative to the medium, thereby to perform magnetic writing on the magnetic stripe; and
   a second control section which causes the magnetic head to magnetically write prescribed data on the magnetic stripe, asynchronously with the relative motion of the magnetic head;
   wherein the second control section includes a counter that counts a value and a memory section which stores a preset value, and
   wherein the second control section generates a write-timing signal when the value counted by the counter coincides with the preset value stored in the memory section, and performs magnetic writing in accordance with the generated write-timing signal.

2. A magnetic write control apparatus comprising:
   transport means for transporting an inserted medium equipped with a magnetic stripe, thereby to move the magnetic stripe to a magnetic write position;
   first control means for moving a magnetic head and the medium relative to each other, thereby to perform magnetic writing on the magnetic stripe; and
   second control means for causing the magnetic head to magnetically write prescribed data on the magnetic stripe, asynchronously with the relative motion of the magnetic head and the medium;
   wherein the second control means includes a counter that counts a value and a memory section which stores a preset value, and
   wherein the second control means generates a write-timing signal when the value counted by the counter coincides with the preset value stored in the memory section, and performs magnetic writing in accordance with the generated write-timing signal.

* * * * *